(12) United States Patent
Mathias et al.

(10) Patent No.: US 7,455,928 B2
(45) Date of Patent: Nov. 25, 2008

(54) DIFFUSION MEDIA FOR USE IN A PEM FUEL CELL

(75) Inventors: Mark F Mathias, Pittsford, NY (US); Jörg Roth, Trebur (DE); Michael K Budinski, Pittsford, NY (US)

(73) Assignee: General Motors Corporation, Detroit, MI (US)

( * ) Notice: Subject to any disclaimer, the term of this patent is extended or adjusted under 35 U.S.C. 154(b) by 925 days.

(21) Appl. No.: 10/643,061

(22) Filed: Aug. 18, 2003

(65) Prior Publication Data

US 2005/0042500 A1 Feb. 24, 2005

(51) Int. Cl.
*H01M 4/00* (2006.01)
*H01M 8/00* (2006.01)
*C25B 11/03* (2006.01)
*C25B 11/00* (2006.01)
*B05D 5/12* (2006.01)

(52) U.S. Cl. ............................. 429/42; 429/41; 429/12; 204/284; 204/283; 427/115

(58) Field of Classification Search ................ 429/12, 429/30, 38, 41, 42
See application file for complete search history.

(56) References Cited

U.S. PATENT DOCUMENTS

| 5,707,755 | A | | 1/1998 | Grot |
| 6,010,606 | A | * | 1/2000 | Denton et al. ............... 204/284 |
| 6,638,883 | B2 | | 10/2003 | Gaffney et al. |
| 2005/0142430 | A1 | | 6/2005 | Yoshida et al. |

* cited by examiner

*Primary Examiner*—Patrick Ryan
*Assistant Examiner*—Helen Chu

(57) ABSTRACT

A diffusion media is provided for implementation with a PEM fuel cell. The diffusion media is a permeable sheet that is rigid along a transverse axis, flexible along a lateral axis and has a substantially incompressible thickness. The diffusion media is able to be mass produced in large sheets and rolled along the lateral axis for transport and storage. The rigidity of the transverse axis is provided by either inclusion of larger fibers or metallic strips aligned in the transverse direction and prevents tenting of the diffusion media into flow channels of the PEM fuel cell. The diffusion media is water and gas permeable and electrically conductive.

10 Claims, 4 Drawing Sheets

DIFFUSION MEDIA FOR USE IN A PEM FUEL CELL

FIELD OF THE INVENTION

The present invention relates to PEM fuel cells and more particularly to an improved diffusion media for use in a PEM fuel cell.

BACKGROUND OF THE INVENTION

Fuel cells have been used as a power source in many applications. For example, fuel cells have been proposed for use in electrical vehicular power plants to replace internal combustion engines. In proton exchange membrane (PEM) type fuel cells, hydrogen is supplied to the anode of the fuel cell and oxygen is supplied as the oxidant to the cathode. PEM fuel cells include a membrane electrode assembly (MEA) comprising a thin, proton transmissive, non-electrically conductive, solid polymer electrolyte membrane having the anode catalyst on one face and the cathode catalyst on the opposite faces The MEA is sandwiched between a pair of non-porous, electrically conductive elements or plates which (1) serve as current collectors for the anode and cathode, and (2) contain appropriate channels and/or openings formed therein for distributing the fuel cell's gaseous reactants over the surfaces of the respective anode and cathode catalysts.

The term "fuel cell" is typically used to refer to either a single cell or a plurality of cells (stack) depending on the context. A plurality of individual cells are typically bundled together to form a fuel cell stack and are commonly arranged in electrical series. Each cell within the stack includes the membrane electrode assembly (MEA) described earlier, and each such MEA provides its increment of voltage. A group of adjacent cells within the stack is referred to as a cluster.

In PEM fuel cells, hydrogen ($H_2$) is the anode reactant (i.e., fuel) and oxygen is the cathode reactant (i.e., oxidant). The oxygen can be either a pure form ($O_2$) or air (a mixture of predominantly $O_2$ and $N_2$). The solid polymer electrolytes are typically made from ion exchange resins such as perfluorinated sulfonic acid. The anode/cathode typically comprises finely divided catalytic particles, which are often supported on carbon particles, and mixed with a proton conductive resin. The catalytic particles are typically costly precious metal particles. As such these MEAs are relatively expensive to manufacture and require certain conditions, including proper water management and humidification and control of catalyst fouling constituents such as carbon monoxide (CO), for effective operation.

The electrically conductive plates sandwiching the MEAs may contain an array of grooves in the faces thereof that define a reactant flow field for distributing the fuel cell's gaseous reactants (i.e., hydrogen and oxygen in the form of air) over the surfaces of the respective cathode and anode. These reactant flow fields generally include a plurality of lands that define a plurality of flow channels therebetween through which the gaseous reactants flow from a supply header at one end of the flow channels to an exhaust header at the opposite end of the flow channels.

Covering the reactant flow fields is a diffusion media serving several functions. One of these functions is the diffusion of reactant gases therethrough for reacting within the respective catalyst layer. Another is to diffuse reaction products, namely water, across the fuel cell. Additionally, the diffusion media must conduct electrons and heat between the catalyst layer and bipolar plate. In order to properly perform these functions, the diffusion media must be sufficiently porous while maintaining sufficient strength. Strength is required to prevent the diffusion media from overt compression within the fuel cell and also from impingement of the diffusion media into the channels of the flow field. Overt compression of the diffusion media results in reduced diffusion capacity. Impingement of the diffusion media into the channels results in reduced flow capacity through the channels and high pressures therein as well as possible loss of electrical contact between the diffusion media and the catalyst layer adjacent to the channels.

Traditional diffusion media have sought to provide the required strength characteristics through the introduction of stiffer materials, such as metal mesh, within the plane of the diffusion media. Such solutions limit flexibility in shipping and manufacture of the fuel cells and introduce corrosion and contact resistance issues.

SUMMARY OF THE INVENTION

The present invention provides a diffusion media for implementation with a PEM fuel cell, including a permeable sheet rigid along a transverse axis, flexible along a lateral axis and having a substantially incompressible thickness. Furthermore, the diffusion media is produced continuously as a roll, and the relatively rigid (transverse) axis is in the cross-machine direction and the flexible (lateral) axis is along the machine direction. The permeable sheet is electrically conductive.

In accordance with a first preferred embodiment, the diffusion media further includes a first plurality of fibers substantially aligned along the transverse axis and a second plurality of fibers substantially aligned along the lateral axis, wherein each of the first plurality of fibers is larger (e.g. in length or in diameter) than each of the second plurality of fibers. In accordance with a second preferred embodiment, the diffusion material further includes a plurality of strips substantially aligned along said transverse axis. Each of the plurality of strips is preferably made of a stiff (i.e., high tensile modulus of elasticity) corrosion-resistant material (e.g. stainless steel). In both of these embodiments, the transverse axis is the cross-machine direction of the diffusion media.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
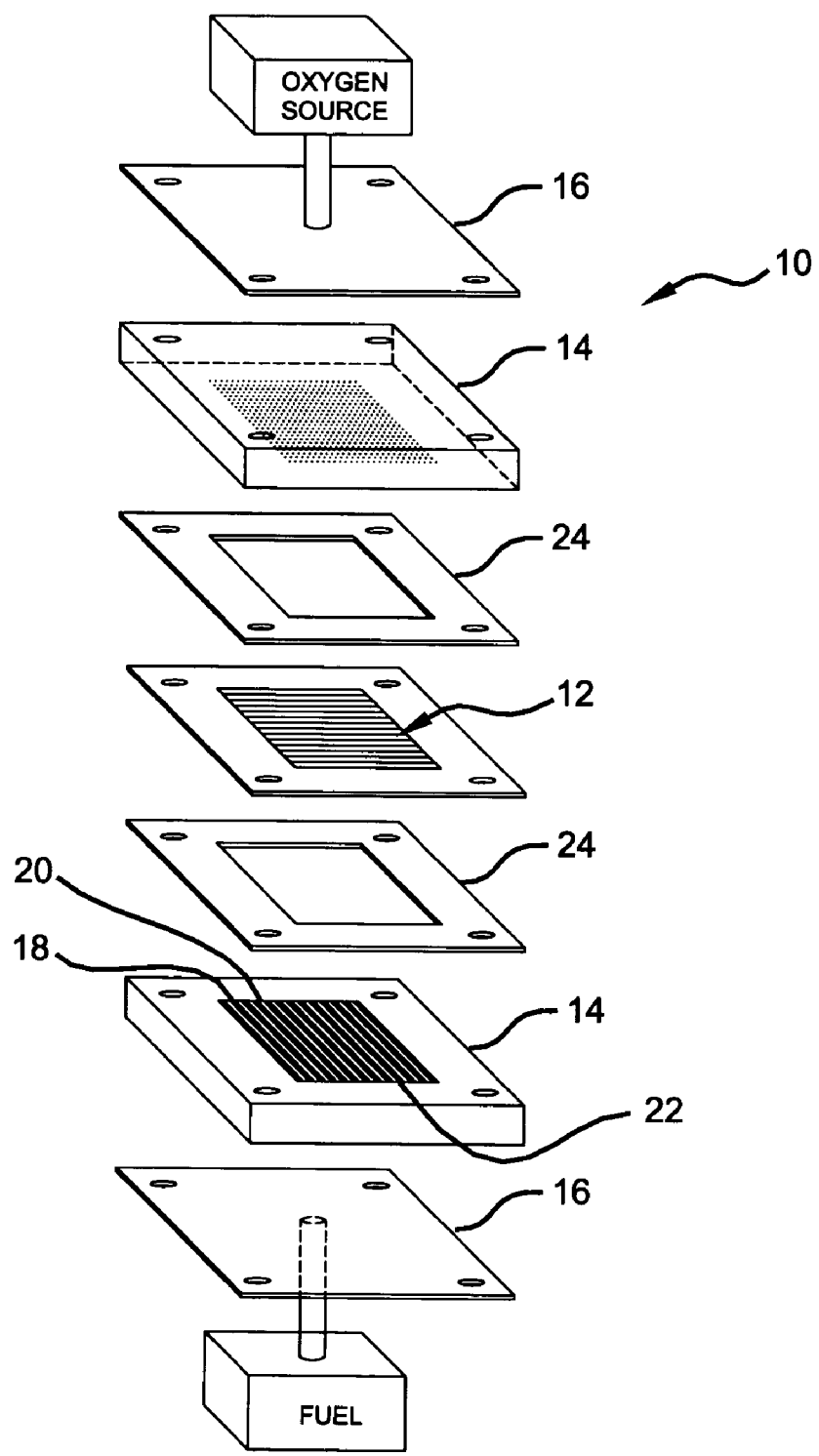
FIG. 1 is an exploded perspective view of a PEM fuel cell stack according to the principles of the present invention.

With reference to FIG. 1, a monocell PEM fuel cell 10 is shown having an MEA 12 sandwiched between a pair of electrically conductive electrode plates 14. It will be appreciated, however, that the present invention, as described hereinbelow, is equally applicable to PEM fuel cell stacks that comprise a plurality of single cells arranged in series and separated from one another by bipolar electrode plates commonly known in the art. The plates 14 may be formed of a composite of conductive material and polymer binders, carbon, graphite or corrosion-resistant metals. The MEA 12 and electrode plates 14 are clamped together between stainless steel end plates 16. The electrode plates 14 each contain a plurality of lands 18 defining a plurality of flow channels 20 that form a flow field 22 for distributing reactant gases (i.e. $H_2$ and $O_2$) to opposing faces of the MEA 12. In the case of a multi-cell PEM fuel cell stack, a flow field is formed on either side of the bipolar plate, one for $H_2$ and one for $O_2$. Nonconductive gaskets 24 provide seals and electrical insulation between the several components of the fuel cell 10. Insulated bolts (not shown) extend through holes located at the corners of the several components for clamping the PEM fuel cell 10 together.

Figure 2:
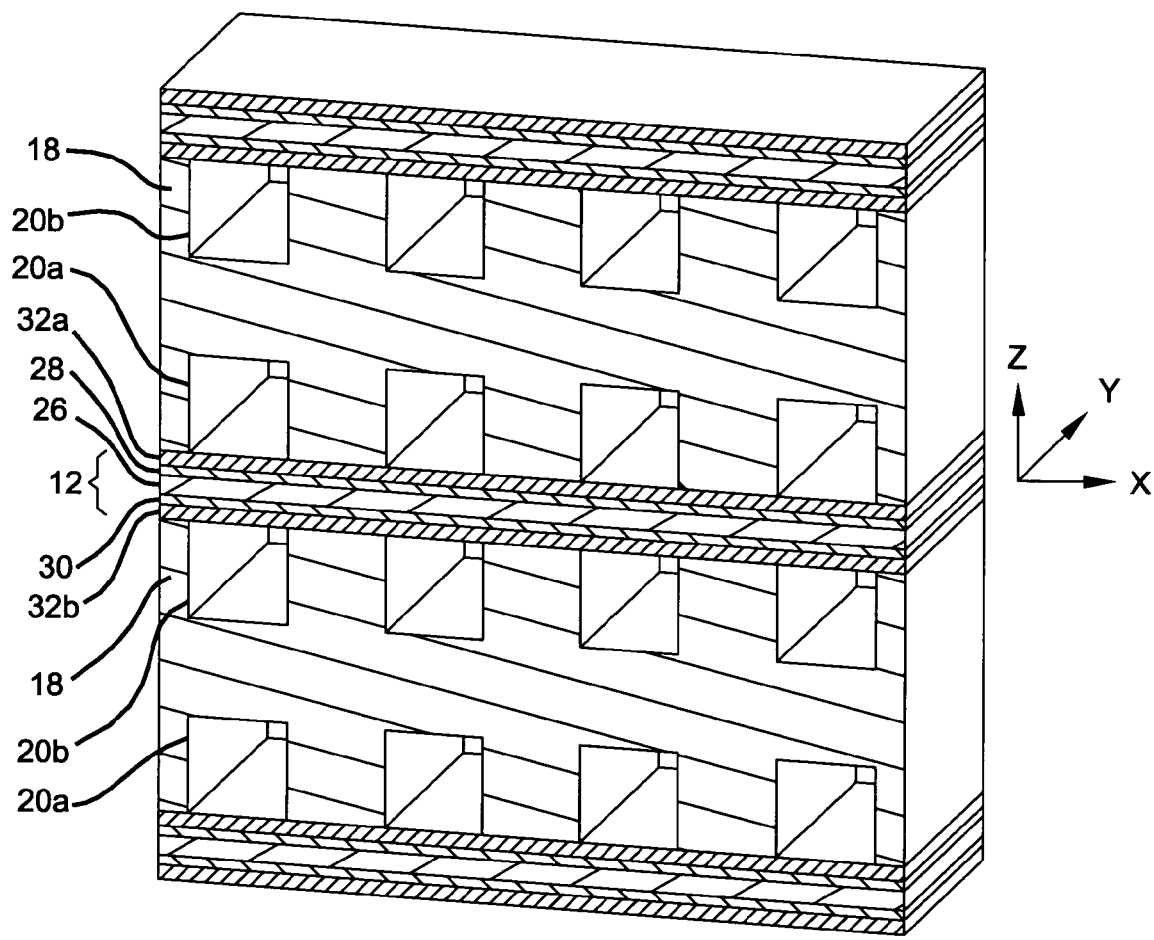
FIG. 2 is a partial perspective cross-sectional view of a portion of the PEM fuel cell stack of FIG. 1 showing layering including diffusion media.
Figure 3:
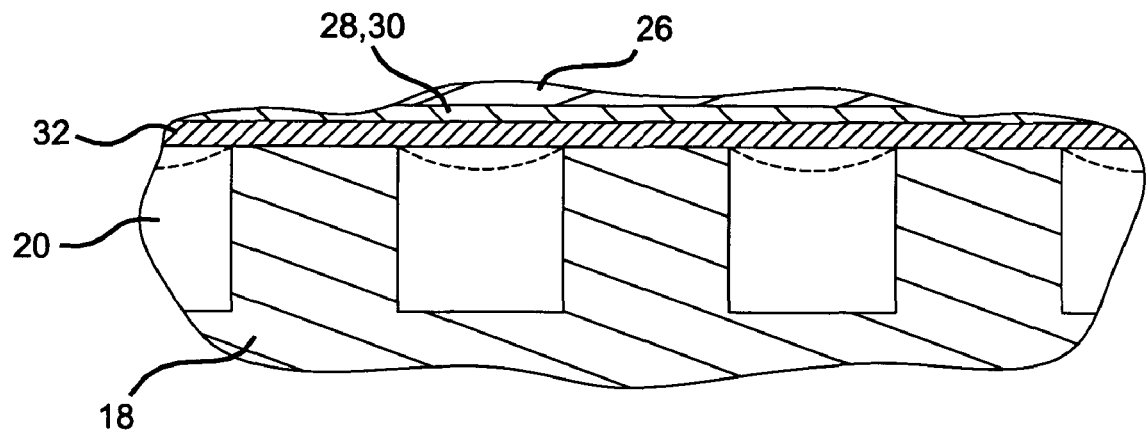
FIG. 3 is a more focused plan view of the portion detailed in FIG. 2.

With particular reference to FIGS. 2 and 3, the MEA 12 includes a membrane 26 sandwiched between an anode catalyst layer 28, a cathode catalyst layer 30, an anode diffusion media 32a and a cathode diffusion media 32b. As shown, $H_2$ flow channels 20a that form the anode side $H_2$ flow field, lie immediately adjacent the anode diffusion media 32a and are in direct fluid communication therewith. Similarly, $O_2$ flow channels 20b that form the cathode side $O_2$ flow field, lie immediately adjacent the cathode diffusion media 32b and are in direct fluid communication therewith.

In operation, the $H_2$-rich stream flows into an inlet side of the anode side flow field and concurrently, the $O_2$ stream (e.g. air) flows into an inlet side of the cathode side flow field. $H_2$ flows through the MEA 12 and the presence of the anode catalyst 28 causes the $H_2$ to dissociate into hydrogen ions (H+), with each giving up an electron. The electrons travel from the anode side to an electric circuit (not shown) for enabling work to be performed (e.g. rotation of an electric motor). The membrane layer 26 enables protons to flow through while preventing electron flow therethrough. Thus, the H+ ions flow directly through the membrane to the cathode catalyst 28. At the cathode side, the H+ ions combine with $O_2$ and the electrons returning from the electric circuit, thereby forming water. Because the above-described reactions occur as the reactants flow through their respective flow fields, the majority of the resulting water is typically concentrated near an outlet side of the cathode.

The properties of the diffusion media 32 will be discussed relative to the x, y and z axes identified in FIG. 2. The x-direction (or transverse axis) is in plane and perpendicular to the flow channels 20. The y-direction (or lateral axis) is also in plane but parallel to the flow channels 20. Finally, the z-direction is through the x-y plane.

The diffusion media 32 enables diffusion of the reactants (i.e. $H_2$ and $O_2$), as well as the reaction products (i.e. $H_2O$) therethrough. In this manner, the reactants are able to flow from the flow channels 20, through the diffusion media 32 and into contact with their respective catalysts for enabling the required reaction. As described previously, one product of the reaction is $H_2O$. The redistribution of $H_2O$ across the PEM fuel cell 10 is of significant importance to the performance of the PEM fuel cell 10. The diffusion media 32 enables the flow of $H_2O$ therethrough, from more hydrated areas to drier areas for homogeneously hydrating the PEM fuel cell 10. Further, the flow of electrons is also a significant factor in the performance of the PEM fuel cell 10. Inhibited electron flow results in poor performance and inefficiency.

With respect to the performance requirements, the diffusion media 32 is sufficiently electrically conductive and fluid permeable. In the x- and z-directions, the fluid permeability of the diffusion media 32 is high for transporting reactant gas and/or $H_2O$ under the lands 18 disposed between the flow channels 20. The electrical conductivity is high to transport electrons over the flow channels 20 from the lands 18, to the MEA 12. The fluid permeability and electrical conductivity are less important in the y-direction.

The diffusion media 32 of the present invention is anisotropic, whereby the properties thereof are not the same in the x-, y- and z-directions. As a result, the diffusion media properties match the requirements of an easily rollable or roll-good diffusion media, as well as the requirements of a diffusion media for use in a fuel cell with largely parallel channels. The diffusion media 32 is characterized by two significant mechanical properties: tensile modulus of elasticity (MOE) and tensile modulus of rupture (MOR). The MOE is based on stress and deflection measurements as a force is applied to the diffusion media 32. The MOE is defined as elastic stress divided by elastic strain and is an intrinsic material property. The MOR is based on the onset of material damage as a result of the applied bending force. For brittle materials such as carbon fiber diffusion media, the tensile MOE and MOR are typically measured by 3 or 4 point bend testing (e.g. ASTM D790 or D6272, respectively).

The raw form of the diffusion media 32 must be easily transportable and facilitate mass production. An ideal raw form of the diffusion media 32 is a long continuous sheet that is rolled. Rolls are easily and efficiently transported to the appropriate assembly location. To facilitate rolling, the diffusion media 32 must be flexible. For diffusion media manufacture, it is sufficient to roll the diffusion media material around a core of approximately 6 to 12 inches. In contrast to this flexibility requirement, the diffusion media 32 must be sufficiently stiff or rigid such that it does not impinge or tent into the flow channels 20. Tenting results in an undesirable pressure drop within the flow channels 20 and reduced electrical contact with the catalyst layer, thereby reducing fuel cell performance.

Traditionally, the most commonly used diffusion media material is carbon fiber paper such as made by Toray in Japan (product designation TGPH-060) and Spectracorp in Massachusetts USA (2050A). More recently SGL in Germany and Mitsubishi Rayon in Japan produce continuous carbon fiber paper for use as diffusion media. In the processing sequence of all of these products, continuous rolls of carbon fiber paper are initially formed using a "wet-laid" process implementing conventional papermaking equipment. In this process, chopped carbon fibers (e.g., 7 micron diameter, 3-15 millimeter length) are dispersed in water and fed to a head box that drops the dispersion onto a rotating porous drum or wire screen with a vacuum dryer to remove the water. The still-wet web is pulled off of the far side of the drum or screen and fully dried in an oven or on hot, large diameter (e.g., 1 to 2 meter) rotating drums. The material is continuously rolled up at the end of the drying procedure. These materials exhibit a preponderance of fibers laid out in the machine direction due to the manufacturing process, in which fibers are drawn in the machine direction as they are deposited into the fiber mat. Even with agitation in the head box, the machine to cross-machine orientation as indicated by in-plane resistance or mechanical measurements is generally 1.5 to 1, and this can approach 4 or 5 to 1 with no head box agitation.

The paper made as described above undergoes additional processing before it is ready for use in a fuel cell. Specifically, binders and fillers are added, the product is molded to the desired thickness and is heated to carbonization or graphitization temperatures to obtain required electrical and thermal conductivity.

The processing sequence described above naturally leads to a material that is less flexible in the machine direction than the cross-machine direction due to the preferred alignment of the fibers in the machine direction. Unfortunately, this is not desirable because the material becomes more difficult to roll due to this feature of the papermaking process.

The mechanical properties of the diffusion media 32 are different in the x- and y-directions (i.e. anisotropic) to achieve the flexibility (for rolling) and rigidity (to avoid tenting) requirements. The tensile MOE property in the x-direction is high, thereby preventing tenting and also preventing the diffusion media 32 from pulling away from its respective catalyst layer. The tensile MOE property in the y-direction is lower, thereby enabling rolling of the diffusion media 32 in the y-direction. During diffusion media production, the material is preferably processed as rolls through continuous production machines. Thus, the y-direction is aligned with the machine direction and the x-direction is aligned with the cross-machine direction. With respect to the z-direction, the compressive elastic modulus and strength is preferably high to prevent over-compression of the diffusion media 32 within the PEM fuel cell 10. Over-compression of the diffusion media 32 results in reduced fluid permeability.

The roll diameter (r) around which the diffusion media 32 can be rolled without breaking is based on the MOE and MOR properties. The roll diameter (r) can be estimated according to the following equation based on Euler curved beam theory:

$$r=[(MOE)(t)]/[(2)(MOR)]$$

where t is the thickness of the diffusion media 32. Because the predictions of the roll diameter have not been verified with experimental data, it is referred to as a rollability index (RI) rather than a quantitative indication of the minimum roll diameter. The smaller the value of r, the more rollable the material is. Referring to the x and y directions in FIG. 2, r can be different in the x versus the y direction.

With reference to Table 1 below, a comparison is made between thin and thick traditional diffusion media (prior art) and thin and thick exemplary diffusion media 32 according to the present invention (controlled orientation). The controlled orientation material is made by adjusting processing parameters of the papermaking step in the carbon fiber processing sequence.

TABLE 1

| Material | Thickness (in) | MOR (psi) | | MOE (psi) | | Reliability Index (in) | |
|---|---|---|---|---|---|---|---|
| | | Machine | Cross Machine | Machine | Cross Machine | Machine | Cross Machine |
| Thin Diffusion Media Example | | | | | | | |
| Prior Art | 0.0072 | 6750 | 3450 | 1070000 | 493000 | 0.57 | 0.50 |
| Controlled Orientation | 0.0083 | 4130 | 5770 | 457000 | 842000 | 0.46 | 0.60 |
| Thick Diffusion Media Example | | | | | | | |
| Prior Art | 0.0119 | 3410 | 2050 | 803000 | 249000 | 1.40 | 0.73 |
| Controlled Orientation | 0.0120 | 1320 | 2950 | 196000 | 666000 | 0.89 | 1.35 |

It is appreciated that the diffusion media 32 properties are merely exemplary and may vary. As seen in the table, in both the case of thick and thin material, the diffusion media 32 (controlled orientation) has significantly reduced MOE and MOR properties in the machine direction (y-direction) and significantly increased MOE and MOR properties in the cross-machine direction (x-direction) as compared with a traditional diffusion media (prior art). The modified process decreases the MOR in the machine direction, but because the MOE decreases by a larger factor, the rollability index (RI) of the modified material decreases relative to that of the prior art. The most desirable modification of the material is to decrease the MOE in the machine direction while keeping the MOR constant.

Figure 4:
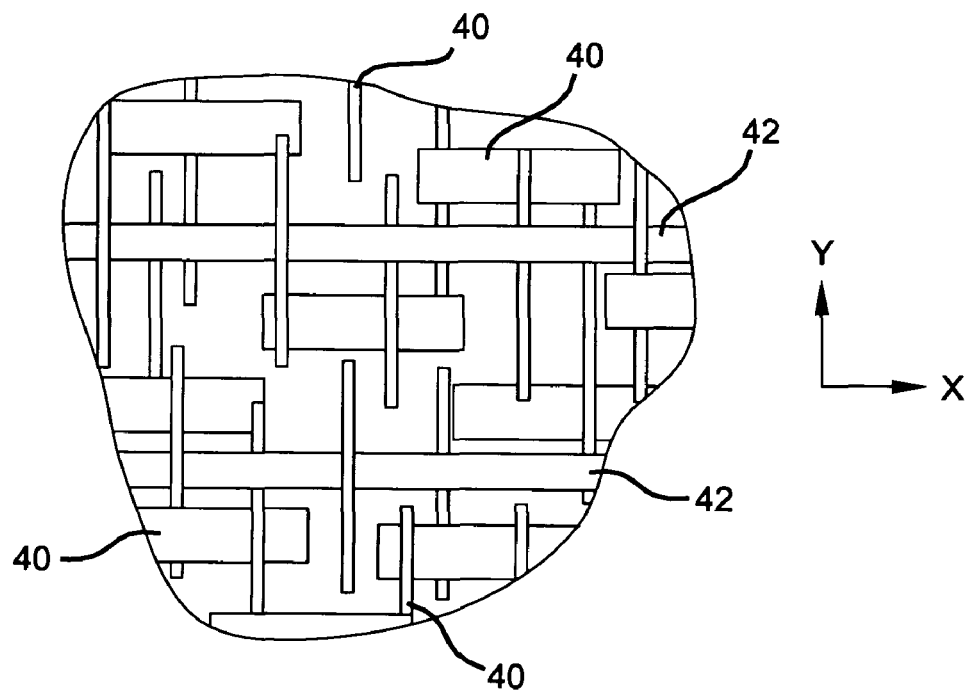
FIG. 4 is a detailed view of a fiber configuration of the diffusion media.

Differently sized fibers are used to vary the material properties in the machine and cross-machine directions. In the case of diffusion media 32 comprising carbon or graphite fibers 40, the fibers in the x-direction can be longer and/or of a larger diameter than those in the y-direction (see FIG. 4). Alternatively, a series of metal wires 42 generally aligned in the x-direction can be introduced. The preferred mechanical requirements of the diffusion media 32 include the MOE in the x-direction being greater than twice the MOE in the y-direction.

Figure 5:
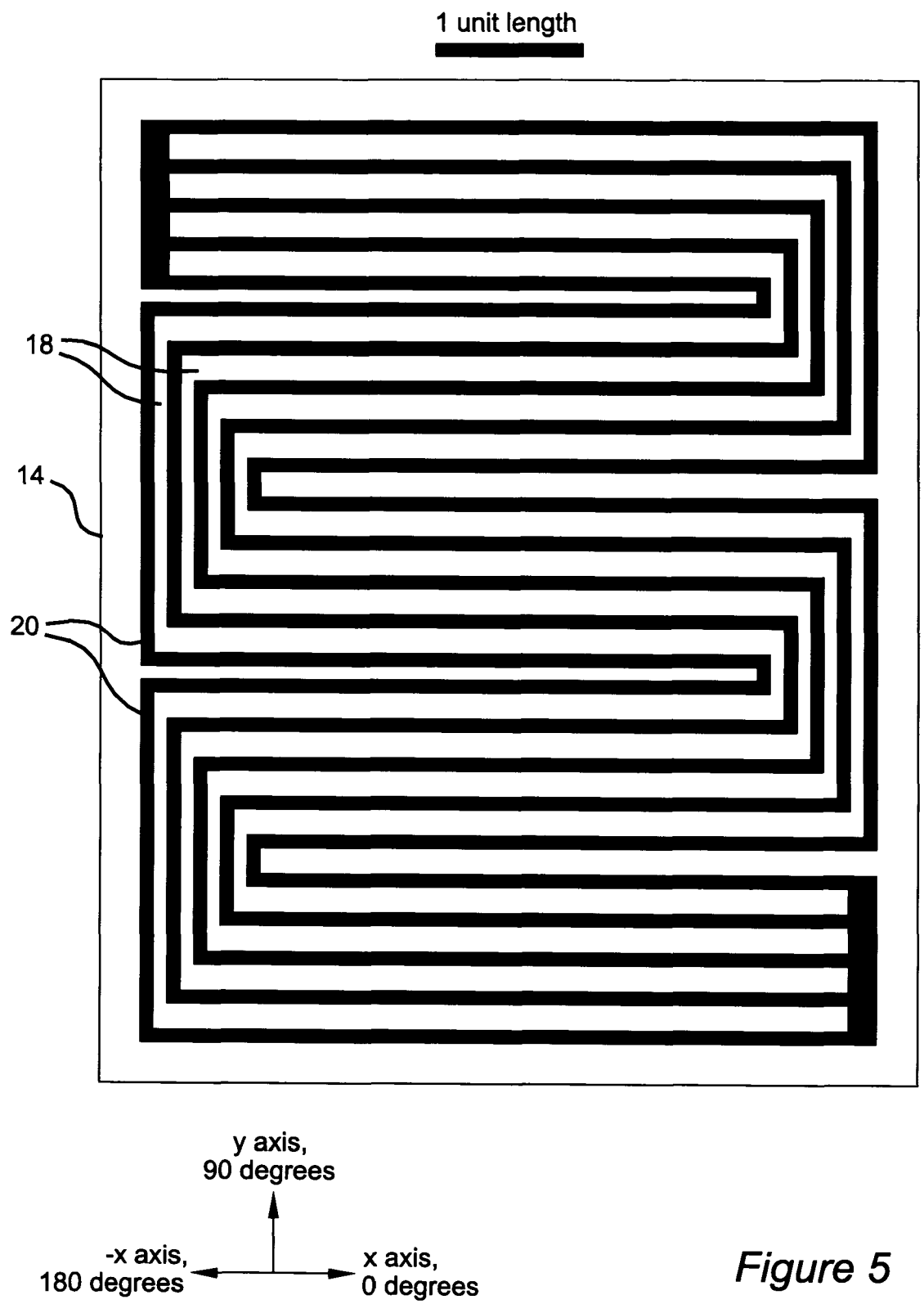
FIG. 5 is a plan view of an exemplary flow field of the PEM fuel cell stack.

Referring now to FIG. 5, an exemplary flow field is shown. The flow field includes the flow channels 20 and the lands 18. The diffusion media 32 is implemented in the fuel cell 10 such that the in-plane direction of the diffusion media 32 having the largest MOE (i.e., x-direction) is aligned across the predominant direction of the flow channels 20. The predominant channel direction is the angular direction in the x-y plane that has the largest cumulative channel length.

Straight channel sections of the flow field have angles between 0 and 180°. That is to say, the straight channel section will lie perpendicular to the y-direction (i.e., 90°), perpendicular to the x-direction (i.e., 0 or 180°) or at an angle somewhere therebetween. The cumulative channel length versus angle of the predominant direction can be determined. For example, a unit length is defined in FIG. 5. The cumulative lengths of the flow channels 20 along the x-axis and the y-axis can be determined based on the unit length. Table 2, below, is an exemplary cumulative length analysis for the exemplary flow field of FIG. 5.

TABLE 2

| Axis | Cumulative Length | | |
|---|---|---|---|
| | Cathode | Anode | Total |
| X (0° +− 0.5°) | 63 | 63 | 126 |
| Y (90° +− 0.5°) | 16.6 | 16.6 | 33.2 |

Table 2 indicates that the predominate direction for the flow field of FIG. 5 is along the x-axis. It is appreciated that the values provided in Table 2 are merely exemplary and indicate the cumulative channel lengths for the exemplary flow field of FIG. 5 using the unit length defined.

Although it is preferable that the x-direction of the diffusion media 32 is aligned perpendicular to the predominant flow field direction, it is anticipated that the x-direction of the diffusion media can be skewed from perpendicular up to approximately +/−45°.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A PEM fuel cell comprising:
   an electrode plate having a flow field formed therein; and
   a membrane-electrode assembly including permeable diffusion media disposed adjacent said electrode plate, said permeable diffusion media being rigid along a transverse axis, flexible along a lateral axis and having a substantially incompressible thickness, wherein said transverse axis crosses first channels of said flow field, said first channels defining a predominate flow direction.

2. The PEM fuel cell of claim 1, wherein said permeable diffusion media is electrically conductive.

3. The PEM fuel cell of claim 1, wherein said permeable diffusion media comprises a first plurality of fibers substantially aligned along said transverse axis, a second plurality of fibers substantially aligned along said lateral axis, and wherein each of said first plurality of fibers is larger than each of said second plurality of fibers.

4. The PEM fuel cell of claim 3, wherein each of said first plurality of fibers is of a larger diameter than each of said second plurality of fibers.

5. The PEM fuel cell of claim 3, wherein each of said first plurality of fibers is of a greater length than each of said second plurality of fibers.

6. The PEM fuel cell of claim 3, wherein each of said first and second plurality of fibers comprise carbon.

7. The PEM fuel cell of claim 3, wherein each of said first and second plurality of fibers comprise graphite.

8. The PEM fuel cell of claim 3, wherein each of said first plurality of fibers is carbon or graphite and each of said second plurality of fibers is carbon or graphite.

9. The PEM fuel cell of claim 1, wherein said permeable diffusion media further comprises a plurality of strips substantially aligned along said transverse axis.

10. The PEM fuel cell of claim 9, wherein each of said plurality of strips is made of stainless steel.

\* \* \* \* \*